Aug. 5, 1924.

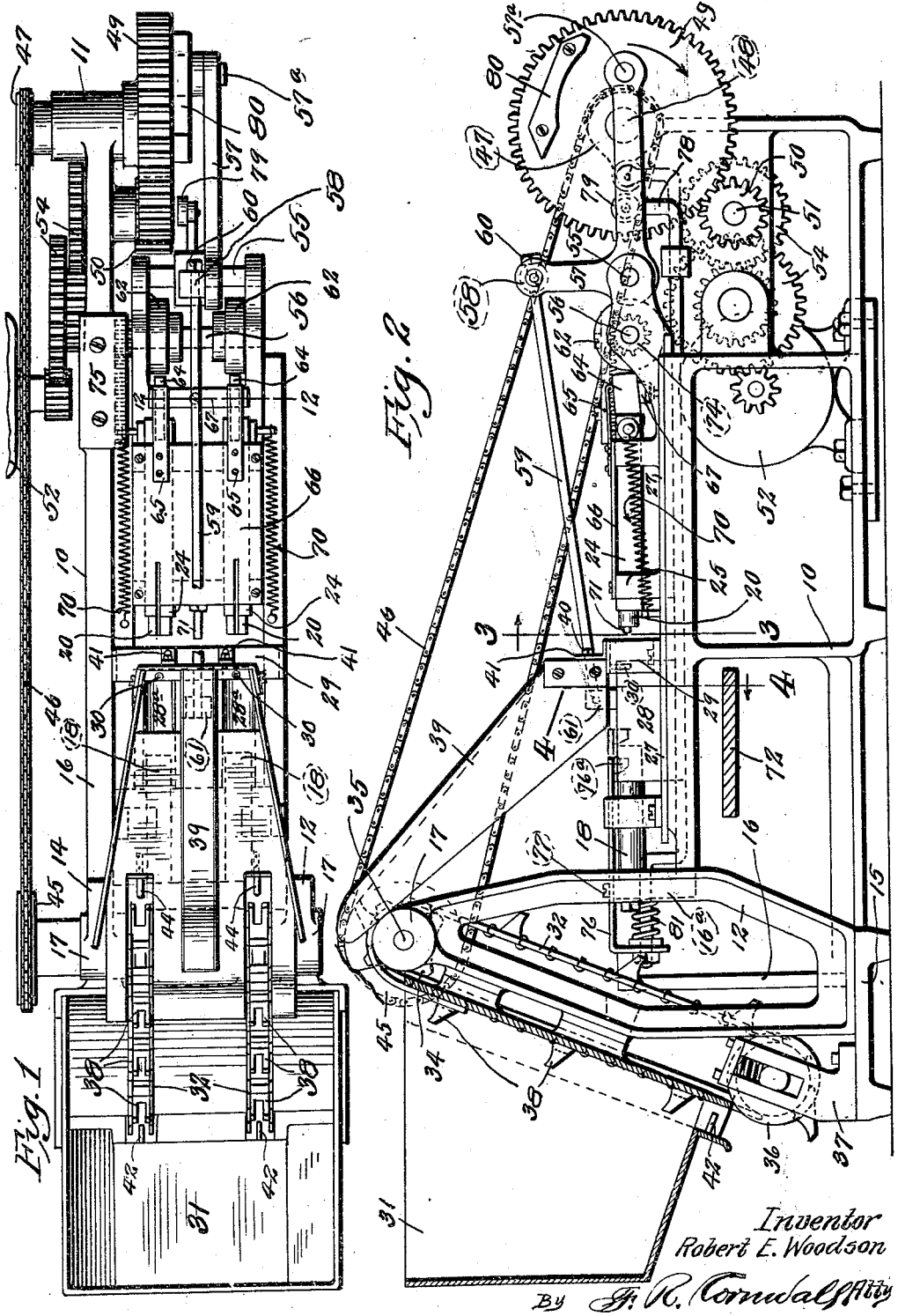

R. E. WOODSON

MACHINE FOR CRACKING NUTS

Filed Feb. 18, 1922   3 Sheets-Sheet 2

Inventor
R. E. Woodson
By F. R. Cornwall Atty

Aug. 5, 1924.
R. E. WOODSON
1,503,577
MACHINE FOR CRACKING NUTS
Filed Feb. 18, 1922    3 Sheets-Sheet 3
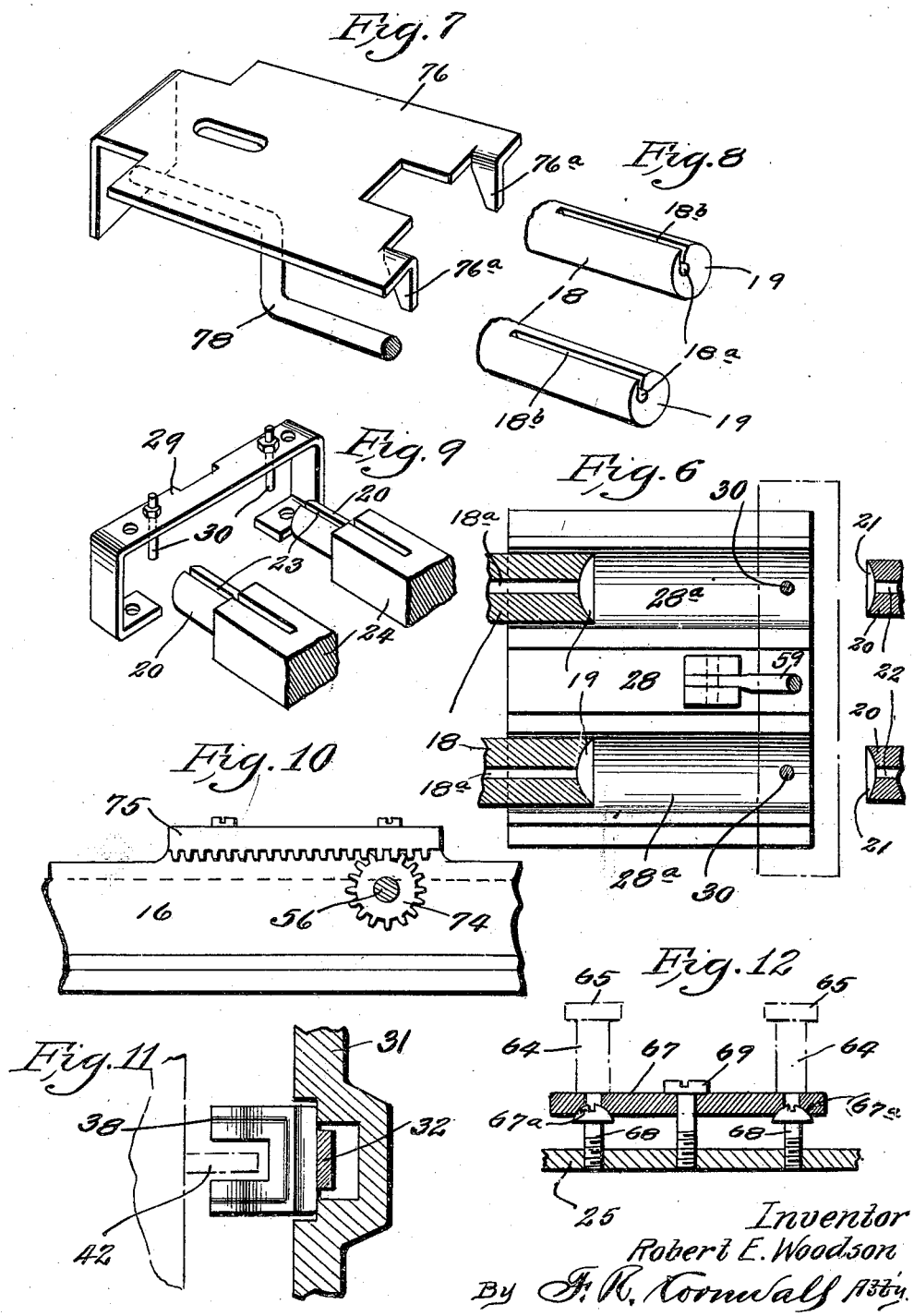
Inventor
Robert E. Woodson
By F. R. Cornwall Atty.

Patented Aug. 5, 1924.

1,503,577

UNITED STATES PATENT OFFICE.

ROBERT E. WOODSON, OF WEBSTER GROVES, MISSOURI.

MACHINE FOR CRACKING NUTS.

Application filed February 18, 1922. Serial No. 537,434.

*To all whom it may concern:*

Be it known that I, ROBERT E. WOODSON, a citizen of the United States, residing at the city of Webster Groves, county of St. Louis and State of Missouri, have invented a certain new and useful Improvement in Machines for Cracking Nuts, of which the following is a full, clear, and exact description, such as will enable others skilled in the art to which it appertains to make and use the same, reference being had to the accompanying drawings, forming part of this application.

This invention relates to new and useful improvements in machines for cracking nuts, and the objects of the invention are: to generally improve upon and simplify the construction of machines of the class described and to reduce to minimum the manufacturing as well as the operating costs of the machine.

Further objects of my invention are to provide simple and effective ejecting mechanism which will positively eject the nut from the cracking members, thereby eliminating sticking of the cracked nuts in said cracking members and the resultant mashing of the nuts and choking up of the machine, and to provide means for blocking or closing the open end of the receiving trough when in receiving position.

Still further objects of my invention are to form the nut engaging ends of the cracking members with centrally disposed longitudinal bores or recesses whereby cracking pressure is applied at points concentric with the axis of the nut and spaced inwardly a suitable distance from the ends thereof instead of to the tips or ends of the nuts.

Further objects of my invention are to provide suitable simple and efficient means for adjusting the displaceable locking or thrust member of the movable cracking member with respect to its actuating member; and to provide improved means for delivering the nuts from the hopper to the chute.

With these and other objects in view, my invention consists in certain novel features of construction and arrangements of parts hereinafter more fully described and claimed, and illustrated in the accompanying drawings, in which,—

Figure 1 is a top plan view of the machine.

Figure 2 is a side elevation of the same with the hopper in section.

Figure 6 is a plan view of the nut receiving trough or channel member with the cracking members shown in cross-section.

Figure 7 is a detail perspective view of the projecting mechanism for the stationary cracking member.

Figure 8 is a detail perspective view of the stationary cracking members or jaws.

Figure 9 is a detail perspective view of the movable cracking members and ejecting means therefor.

Figure 10 is a detail view of the mechanism used to actuate the movable jaw releasing means.

Figure 11 is a horizontal cross-section through a portion of the hopper showing a chain and a nut carrier in position thereon.

Figure 12 is a vertical cross-section taken on line 12—12 of Figure 1.

Figure 3:
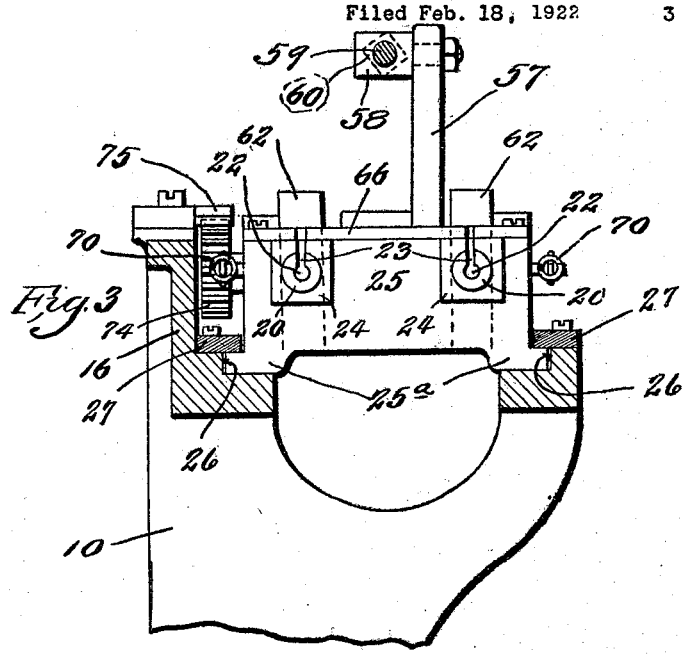
Figure 3 is a vertical cross-section taken on line 3—3 of Figure 2.
Figure 4:
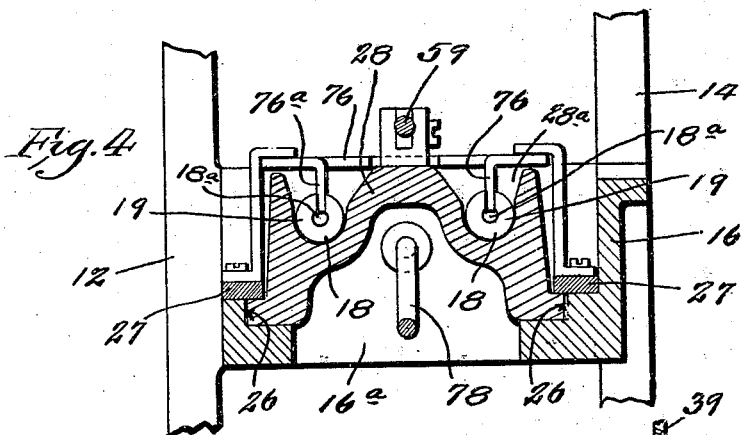
Figure 4 is a vertical cross-section taken on line 4—4 of Figure 2.

Referring by numerals to the accompanying drawings 10 indicates a bedframe of the machine, said bedframe having a bearing 11 at its front end and vertically disposed extensions or brackets 12 and 14 at its rear end. Extension 12, which is comparatively long, rests on and is secured to a base 15 formed integral with bedframe 10. An extension 14 is fixed to and projects upwardly from a longitudinal wall 16 formed on one side of the bedframe 10. Both extensions 12 and 14 are provided at their upper ends with horizontally alined bearings 17. Projecting from side walls 16 and secured to extension 12 is a transverse portion or rear wall 16$^a$ in which are secured in any suitable manner the rear ends of a pair of stationary cracking members or jaws 18, the front or inner ends of which are concaved or recessed, as indicated at 19. Each of these jaws is provided with an axially disposed bore 18$^a$ with which communicates a groove 18$^b$ vertically disposed in its upper face.

Oppositely disposed to jaws 18 and in axial alinement therewith is a pair of movable cracking jaws or members 20, each of which is provided with a concave cracking end 21 at which terminate the end of axial bore 22 and a vertically disposed groove 23.

Jaws 20 are detachably carried by the inner ends of bars 24 which are movably mounted in a carriage 25. This carriage 25 is slidably arranged on bedframe 10 by means of flanges 25ª formed on each side of said carriage and occupying guideways 26 formed in the bedframe 10. Plates 27 are detachably secured to bedframe 10 overhang the guideways 26 and retain flanges 25ª in position thereon. Slidably mounted in guideways 26 between stationary jaws 18 and movable jaw 20 is a nut receiving and positioning member 28 having a longitudinally disposed channel or trough 28ª for each set of cracking jaws 18 and 20, which trough is open at both ends so as to receive the recessed ends of said jaws.

Figure 5:
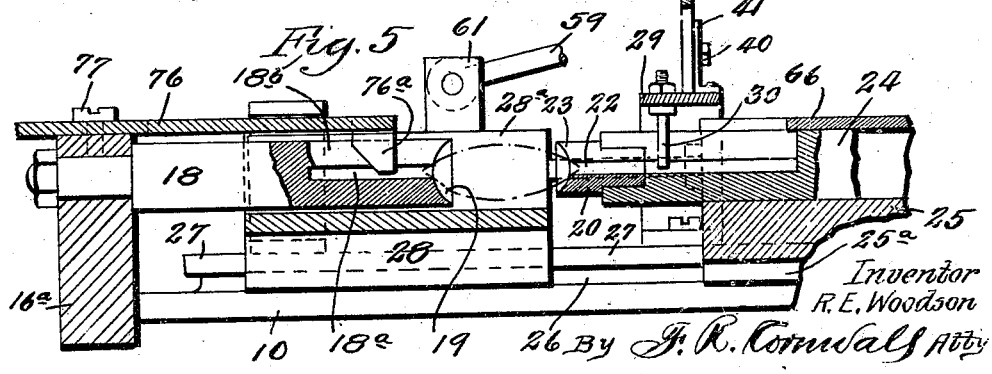
Figure 5 is a fragmental longitudinal cross-section of the machine with the cracking members in the cracking position.

The bridge or bar 29 extends transversely across the frame 10 at a point which is immediately above the end of trough member 28 when the latter is in its nut receiving position, as shown in Figure 1. This bar is spaced a sufficient distance above the guideways 26 to permit the carriage 25 and jaws 20 to pass thereunder. Depending from bar 29 are pins 30 which extend downwardly a suitable distance so that when the nut receiving member 28 is in receiving position, said pins occupy the respective forward ends of troughs or channels 28ª and prevent the passage of the nuts from said troughs through said open ends. These pins 30 are in alinement with grooves 23 of the respective jaws 20, thus permitting jaws 20 to be moved inwardly beyond the positions occupied by pins 30, as shown in Figure 5.

A hopper 31 is secured to extensions 12 and 14 and operating therein through suitable openings formed in the bottom of the hopper are chains 32 which engage sprocket wheels 34 carried by a shaft 35 journaled in bearings 17 and operate over grooved pulleys or rollers 36 journaled under tension in bearings 37, which latter are fixed to base 15 below hopper 31. This chain is provided at suitable intervals with nut carriers or elevators 38, which, during the upward travel of chain 32 through the hopper, carry the nuts upwardly and periodically discharge them singly into a chute 39, the upper end of which rests on bearings 17, and is secured to hopper 31.

Chute 39 slopes forwardly and downwardly and its lower end rests on bar 29 and is detachably secured in position by means of bolts or screws 40 which are seated in brackets or angles 41 projecting upwardly from bar 29. The lower end of chute 39 is provided with discharge openings which are located immediately above troughs 28ª when member 28 is in its forward or receiving position. The nut carriers 38 are bifurcated or slotted, as shown in Figure 11, to clear pins 42 which are carried by the bottom wall of hopper 31 and project within the openings formed in said bottom wall and through which said nut carriers and chains operate. Pins 42 prevent nuts from falling outwardly from the hopper through said opening but offer no obstruction to the passage of chain 32. A finger 44 is arranged in the upper portion of each bottom wall of chute 39 and projects inwardly into the opening through which chain 32 and carriers 38 operate during their downward or return movement. These fingers positively dislodge the nuts from carriers 38 and prevent the nuts from passing outwardly from the chute through the chain opening.

Shaft 35 is operated by means of a sprocket wheel 45 fixed to one end thereof and a sprocket chain 46 which passes over said wheel and engages a smaller sprocket wheel 47 fixed to the outer end of shaft 48 which latter is journaled in bearing 11. The opposite end of shaft 48 carries a large gear 49 meshing with a pinion 50 which is fixed to a shaft 51. This shaft is journaled in a bearing formed in the side wall 16 of frame 10 and is driven by a motor 52 through suitable reduction gearing 54.

The outer end of carriage 25 is provided with bearings in which are journaled shafts 55 and 56. Shaft 55 carries a bellcrank lever 57 one arm of which projects rearwardly and is pivotally connected by means of a wrist pin 57ª to gear 49. This constitutes the operating connection between the drive gear 49 and carriage 25 so that when gear 49 is actuated, wrist pin 57ª is rotated about the axis of shaft 48 in the direction indicated by arrow in Figure 2, causing the carriage 25 and the jaws 20 carried thereby to reciprocate. The other arm of bellcrank 57 extends upwardly and has pivotally mounted thereon a bearing 58 through which slidably operates one end of rod 59 provided on its extreme end with head 60. The opposite end of this rod is pivotally connected to a bearing block 61 projecting upwardly from nut receiving member 28.

The other shaft 56 has fixed thereon a pair of disks 62, there being a disk provided for each jaw 20. These disks occupy positions adjacent to the curved ends of the thrust members 64, which latter are pivotally mounted on the outer end of each bar 24.

A leaf spring 65 fixed to a plate 66 which is secured to the top of carriage 25 presses each thrust member 64 downwardly against a bar 67 which is adjustably held in position on carriage 25 transversely under members 64. This bar is adjustable by means of screws 68 which are screw-seated in carriage 25 and are provided with round heads which occupy semispherical recesses 67ª formed in the underside of said bar. By adjusting screws 68 through suitable apertures formed in plate 67 for that purpose, the bar or plate can be moved to the desired position, in which position it is then locked by a set screw 69 screw seated in carriage 25 and having its head bearing on the upper face of said bar.

The diameter of disk 62 is such that normally thrust members 64 are out of engagement with said disk, in which position they are held by coiled springs 70 connected at one of their ends to a pin projecting from each bar 24 and having their other ends anchored to pins projecting upwardly from carriage 25. When, however, carriage 25 has been moved inwardly a sufficient distance to cause jaws 20 to engage nuts therebetween and jaws 18, the tension of springs 70 is overcome and each bar 24 moves outwardly and causes thrust member 64 to form operative contact with its corresponding disk 62. During this time, carriage 25 continues to move inwardly and the pressure exerted against the nut and the stationary jaw 18 through the medium of jaw 20, bar 24, thrust member 64 and disk 62 crushes the shell of the nut. Immediately after the crushing action takes place, the thrust member 64 is thrown out of operative engagement with disk 62, thereby releasing bar 24 and jaw 20 so that the pressure can no longer be applied to the nut. The inner end of carriage 25 has an outwardly projecting pin 71 which, when carriage 25 moves inwardly, engages members 28ª and moves it out of its receiving position rearwardly so that the cracked nut will be discharged downwardly onto an endless conveyor 72 which passes transversely thereunder through a suitable opening formed in the side wall of frame 10.

When the nut is discharged, spring 70 moves bar 24 inwardly whereby thrust member 64 returns under the influence of spring 65 to its operative position. As the carriage 25 is reciprocally operated in guideways 26 by means of bellcrank 57 and drive gear 49, disks 62 are rotated, first in one direction and then in the opposite direction by means of a pinion 74 fixed to one end of shaft 56 meshing with a stationary rack 75 fixed to said wall 16 of frame 10.

In order to positively eject the nuts from the stationary jaws, 18, a plate 76, which is slidably mounted on wall 16ª by means of a screw 77, is provided on its inner or forward end with depending portions 76ª which operate in grooves 18ᵇ of the jaws 18 and move outwardly past the concave portions 19 when plate 76 is actuated. To actuate plate 76 a rod 78 having its rear end fixed to the rear depending portion of plate 76 extends forwardly through the machine and is provided on its forward end with a roller 79 which is adapted to be engaged by a cam portion 80 fixed to one side of gears 49. The position of cam 80 on gear 49 with respect to the pivotal connection 57ª of bellcrank 57 is such that the depending portions 76ª are moved forwardly and outwardly from jaws 18 immediately after the cracking operation takes place.

A coiled spring 81 arranged on the rear end of rod 78 and having one end pressing against the downwardly bent rear portion of plate 76 and its opposite end resting against a wall 16ª restores plate 76 and rod 78 to their normal position immediately after cam 80 leaves roller 79.

As the cracking operation takes place after movably jaws 20 move rearwardly past pins 30 which lie in the path of movement of said jaws and are designed to enter grooves 23 formed therein, it is obvious that said pins during the return movement of the movably jaws 20 will serve as ejectors and will remove any parts of a nut which may have become lodged in said jaws.

In the operation of my device, hopper 31 is filled with nuts. From this hopper they are fed singly at regular intervals by means of chain operated carriers 38 to the chute 39 through which they descend into the channels formed in the member 28. The inward movement of carriage 25 causes each nut to be gripped between the jaws 18 and 20 and the shell thereof crushed by the pressure applied through the gear 49, bellcrank 57 and disk 62 with which the respective thrust member 64 is brought into operative engagement by the retrograde movement of jaw 20. During this time, member 28 is moved rearwardly by means of pin 71 carried by carriage 25 so that when the nut is cracked, it will be discharged onto conveyor 72. Upon the forward movement of carriage 25 and jaws 20, pin 71 is moved out of contact with member 28 and the latter is restored to its receiving position by the rocking movement of the upper arm of bellcrank 57 which engages head 60 of rod 59 and moves member 28 forwardly through the pivotal connection 61. By raising or lowering bar 67, the duration of operative contact between disk 62 and member 64 can be regulated so as to release jaws 20 at the proper time.

The concaved faces of the jaws assist in seating nuts in proper position and the longitudinal bores formed in said jaws provide clearance for the ends of the nuts and form annular shoulders through which the pressure is applied to the shell at points concentric with the axis of the nut instead of at its ends. Thus, the shell is more effectively cracked at a more uniform pressure.

What I claim is:

1. In a nut cracking machine, a pair of cracking jaws, one of which is movable and the other stationary, ejecting means mounted externally of said movable jaw and having a nut ejecting projection operating in a groove formed in said stationary jaw, said ejecting means being operable in time relation with said movable jaw, a nut receiving member reciprocally mounted between said jaws, a stationary member extending downwardly to close the open forward end of said nut receiving member when the same is in receiving position, and actuating means for said movable jaw and said ejecting means.

2. In a nut cracking machine, a pair of cracking jaws one of which is stationary and the other movable, means for actuating said movable jaw, ejecting means mounted above said movable jaw and having a nut-ejecting lip operating in a groove formed in said stationary jaw, said ejecting means being operable in time relation with said movable jaw, a nut receiving trough reciprocally mounted between said jaws, means adapted to occupy and close the open forward end of said trough while in nut receiving position, said movable jaw being provided with a groove adapted to co-operate with the last mentioned means, and means for actuating said trough.

3. In a nut cracking machine, a bedframe, a stationary cracking jaw fixed thereon, a carriage reciprocally mounted on said bedframe, a movable cracking jaw carried by said carriage and opposing said stationary jaw, means for releasing said movable jaw immediately after the cracking operation takes place, a nut receiving member co-operating with said jaws, a pin carried by the forward end of said carriage and adapted during the rearward movement thereof to engage a nut-receiving member and move it out of receiving position and means for actuating said carriage and adapted to restore said nut receiving member.

4. In a nut cracking machine, a stationary cracking jaw provided with a longitudinal groove, an opposing cracking jaw movable in co-operative relation with said stationary jaw, a slidable member having an extension which operates in the groove of said stationary cracking jaw and designed to eject the nut from said jaw, a driving member for actuating said movable jaw, a cam carried by said driving member and a rod connected to said slidable member and operable by means of said cam.

5. In a nut cracking machine, a stationary cracking jaw provided with a longitudinal groove which terminates in the cracking end of said jaw, an opposing cracking jaw movable in co-operative relation with said stationary jaw, a slidable member one end of which operates in said groove, a driving member for actuating said movable jaw, a cam on said driving member, a rod connected with said slidable member and operable by the cam whereby the portion of slidable member occupying said groove is moved into an ejecting position, and means for restoring said slidable member to retracted position.

6. In a nut cracking machine, a stationary cracking jaw, an opposing cracking jaw movable into cracking relation therewith and provided in its inner or cracking end with an open ended longitudinal groove, means for actuating said movable jaw, a stationary pin transversely disposed relative to said movable jaw and adapted to occupy the groove in said movable jaw before the latter reaches its cracking position whereby said pin acts as an ejector during the return movement of said movable jaw, and a nut receiving member reciprocally operable between said jaws in time relation with said movable jaw.

7. In a nut cracking machine, a stationary cracking jaw, a movable cracking jaw co-operating therewith, said cracking jaws being provided near their ends with longitudinally disposed grooves, a slidable member provided with an extension adapted to operate in the grooves of said stationary jaw, a transversely disposed stationary member adapted to operate in the groove of said movable jaw, means for actuating said slidable member whereby said extension moves into an ejecting position with respect to said stationary jaw, and means for actuating said movable jaw whereby during the return or restoring movement of the latter, said stationary member occupies an ejecting position relative to said movable jaw.

8. In a nut cracking machine, a supporting frame, a stationary cracking jaw supported thereon, a reciprocating carriage mounted on said frame, an oppositely disposed cracking jaw yieldingly mounted on said carriage, a nut receiving member slidably mounted on said frame, between said jaws and adapted to be retracted from its receiving position during the inward movement of said movable jaw, an abutment member mounted on said carriage for engaging and retracting said nut engaging member, and means for restoring said nut receiving member to its receiving position.

9. In a nut cracking machine, a frame, a stationary cracking jaw supported thereon, a carriage reciprocally mounted on said frame, a bar yieldingly mounted in said carriage and provided with a cracking jaw on its inner end, a thrust member pivotally mounted on the opposite end of said bar, a rotatable member on said carriage adapted to be engaged by said thrust member, a trough slidably mounted on said frame between said cracking jaws, means on said carriage for moving said trough from its receiving position to a discharging position, a drive wheel, a bellcrank pivotally mounted on said carriage and operatively connected to said drive wheel, and operative connections between said drive and said bellcrank for restoring the trough to its receiving position.

10. In a cracking machine, a frame, a stationary cracking jaw supported thereon, a carriage reciprocally mounted on said frame, a bar slidably mounted in said carriage and provided at its inner end with a cracking jaw, a thrust member pivotally mounted on the opposite end of said bar, a spring for maintaining said thrust member in operative position, a rotatable member on said carriage adapted to engage and displace said thrust member, and a vertically adjustable plate mounted on said carriage for engaging the underside of said thrust member and regulating the operative position of said thrust member relative to said rotatable member.

11. In a nut cracking machine, a frame, a stationary cracking jaw supported thereon, a carriage reciprocally mounted on said frame, rotatable means journaled on said carriage, a cracking jaw slidably mounted in said carriage and designed to co-operate with said stationary jaw, a releasable member operatively connected to said slidable jaw and adapted to operatively engage said rotatable means when said movable jaw is placed under compression, thereby causing said movable jaw to be released at a predetermined time, and a vertically movable means adjustably mounted on said carriage and bearing against the underside of the releasable member for regulating the operative position of said member with respect to said rotatable means.

12. In a nut cracking machine, a pair of co-operating cracking jaws, one of which is movable and the other stationary, each of said jaws being formed with a concave cracking end and an axial bore or recess, thereby forming an annular sharp nut engaging edge whereby the cracking pressure is applied to the shell concentrically of the ends or tips of the nut, a nut receiving member operatively mounted between said jaws and adapted to position the nuts in the proper alignment with the annular edges of said cracking jaws, said nut-receiving member being movable into a nut discharging position, means for periodically delivering nuts to said receiving member, and means for actuating said movable jaw.

13. In a nut cracking machine, a pair of co-operating cracking jaws, one of which is movable and the other stationary, each of said jaws being formed with a longitudinally disposed groove having one end terminating in the cracking end of the respective jaw, a movable member having an extension which operates in the groove of the stationary cracking jaw, and is movable outwardly past the cracking end thereof, a stationary ejecting member adapted to operate in the groove of the movable jaw, a nut receiving and discharging member co-operating with said jaws, and means for periodically delivering nuts to said nut receiving member.

In testimony whereof I hereunto affix my signature this 11th day of February, 1922.

ROBERT E. WOODSON.